United States Patent [19]
Chern

[11] Patent Number: 5,904,456
[45] Date of Patent: May 18, 1999

[54] COMBINATION OF A DRILL AND A MEANS FOR SECURING THE DRILL IN A CHUCK

[76] Inventor: Lu-Meng Chern, No. 15-3, Chungnan Rd., 5 Lin, Taiping Tsun, Taiping City, Taichung Hsien, Taiwan

[21] Appl. No.: 09/086,643

[22] Filed: May 29, 1998

[51] Int. Cl.$^6$ .................................................. B23B 31/16
[52] U.S. Cl. ............................. 408/240; 279/62; 279/83; 279/137; 408/226; 408/239 R
[58] Field of Search .................. 279/60, 62, 83, 279/127, 137; 408/226, 238, 239 R, 240

[56] References Cited

U.S. PATENT DOCUMENTS

| | | | |
|---|---|---|---|
| 2,606,034 | 8/1952 | Heldenbrand | 279/62 |
| 4,621,818 | 11/1986 | Rohm | 279/62 |
| 4,775,159 | 10/1988 | Manschitz | 279/62 |

*Primary Examiner*—Daniel W. Howell
*Attorney, Agent, or Firm*—William E. Pelton, Esq.

[57] ABSTRACT

A combination of a drill and a device for securing the drill in a chuck which has a body with a central passage and three slots inclinedly defined in a periphery defining the passage. Three clamping members are inclinedly and movably received in the slots and engaged with an annular member rotatably mounted to the three clamping members. The body has at least one aperture defined radially therethrough which communicates with the passage in which the drill is received which has a plan surface defined in an outer periphery thereof such that a positioning member received in the aperture contacts the plan surface to position the drill in place.

4 Claims, 6 Drawing Sheets

COMBINATION OF A DRILL AND A MEANS FOR SECURING THE DRILL IN A CHUCK

BACKGROUND OF THE INVENTION

1. Field of the Invention

The present invention relates to a combination of a drill and a means for securing the drill in a chuck and the means comprises a bolt threadedly extending through a body of the chuck and contacting a surface defined in the drill so as to prevent the drill from rotating when in use.

2. Brief Description of the Prior Art

FIGS. 5 and 6 illustrate a conventional chuck for receiving a drill 70 therein, the chuck generally includes a body 31 having a passage 310 defined centrally therethrough, three inclined slots 311 defined in an inner periphery defining the passage 310, a shaft 50 connected to an upper end of the body 50 so as to be connected to a drill machine for example. A casing 33 is mounted to the shaft 50 with an annular member 35 disposed between the shaft 50 and the casing 33. Three clamping members 40 are respectively inclinedly and movably received in the slots 311 of the body 31 and each have a first toothed portion 41 defined in an outer periphery thereof which is engaged with a second toothed portion 351 of the annular member 35. The annular member 35 has a third toothed portion 34 defined in an underside thereof. A locking tool 60 is inserted into a recess 32 defined in the body 31 at a distal end thereof and has a bevel gear 61 co-axially disposed thereto which is engaged with the third toothed portion 34. When rotating the locking tool 60, the three clamping members 40 are moved inwardly about an axis of the body 31 to clamp the drill 70 in the passage 310. However, the drill 70 is a cylindrical member and clamped by the three clamping members 40 at three limit areas so that when a large torque is applied to the drill 70, a slide movement could happen and a user has to retighten the drill 70 again.

The present invention intends to provide a combination of a drill and a means for securing the drill in a chuck, which includes a bolt extending through a body of the chuck and contacting against a plan surface of the drill so as to effectively mitigate and/or obviate the above-mentioned problems.

SUMMARY OF THE INVENTION

The present invention provides a combination of a drill and a means for securing the drill in a chuck which includes a body having a central passage and three slots inclinedly defined in a periphery defining the passage. Three clamping members are inclinedly and movably received in the slots and each of the clamping members has a first toothed portion defined in an outer periphery thereof. An annular member is rotatably engaged with the first toothed portions of the clamping members and has a second toothed portion defined in an underside thereof. The means comprises at least one aperture defined radially through the body and communicating with the passage in which the drill is received. A positioning member is received in the aperture and contacts the drill.

It is an object of the present invention to provide a combination of a drill and a means for securing the drill in a chuck, comprising a bolt radially extending through a body of the chuck and contacting the drill in the body.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
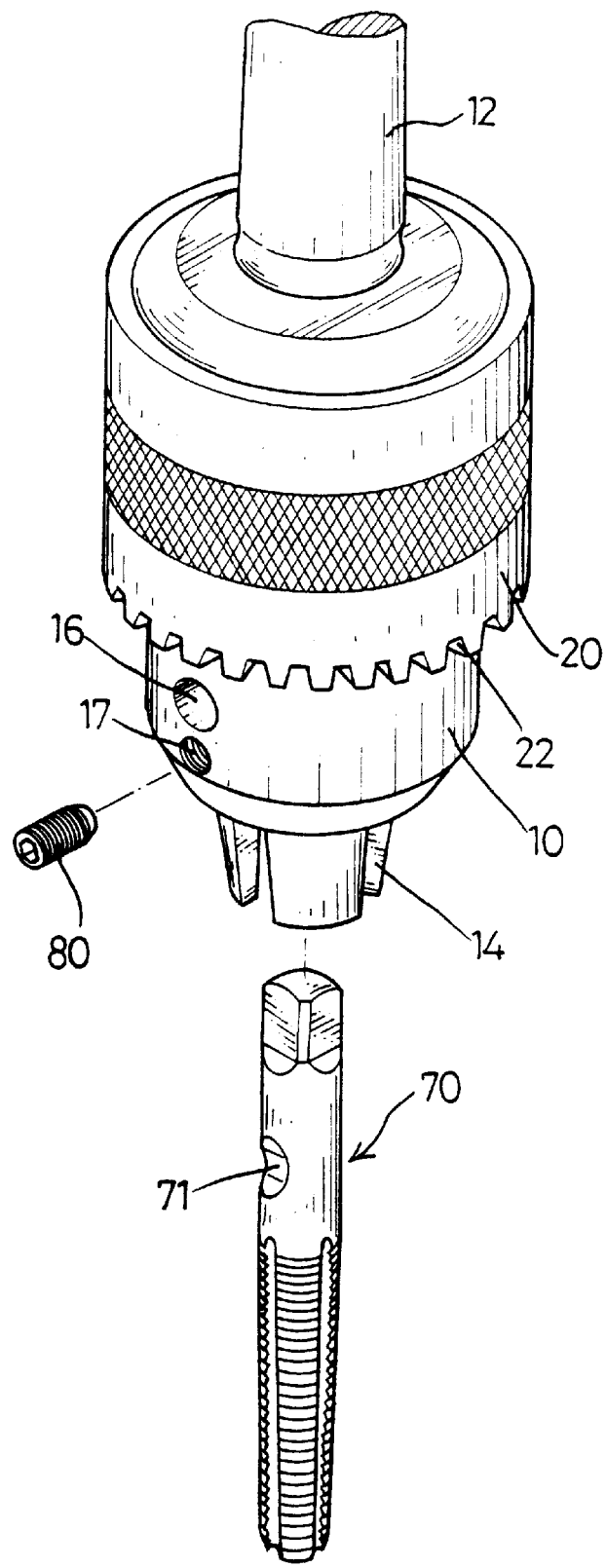
FIG. 1 is an exploded view of a drill and a means of the present invention for securing the drill in a chuck.
Figure 2:
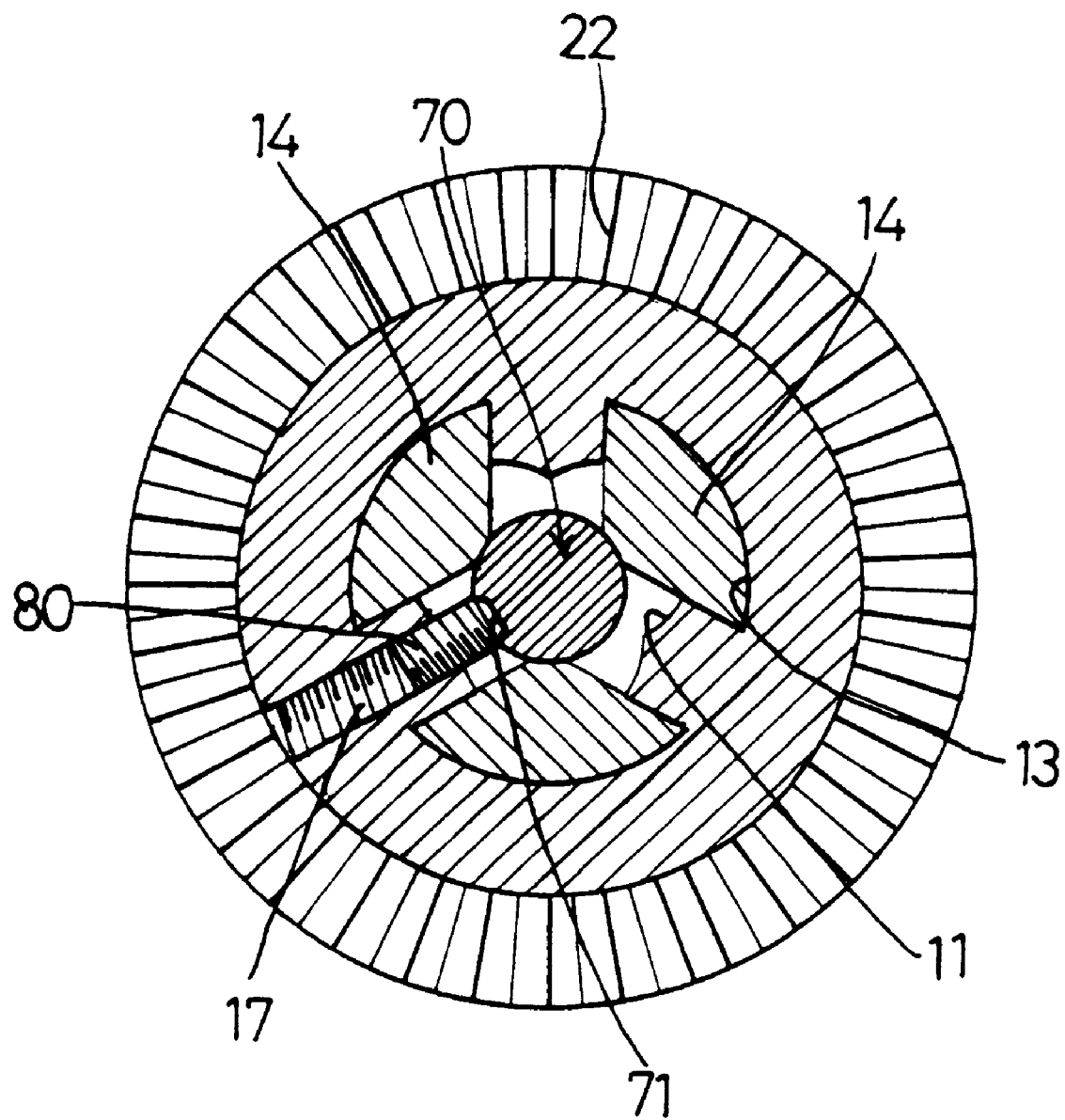
FIG. 2 is a sectional view, partly in section, of the chuck in which the drill is positioned by the means of the present invention.
Figure 3:
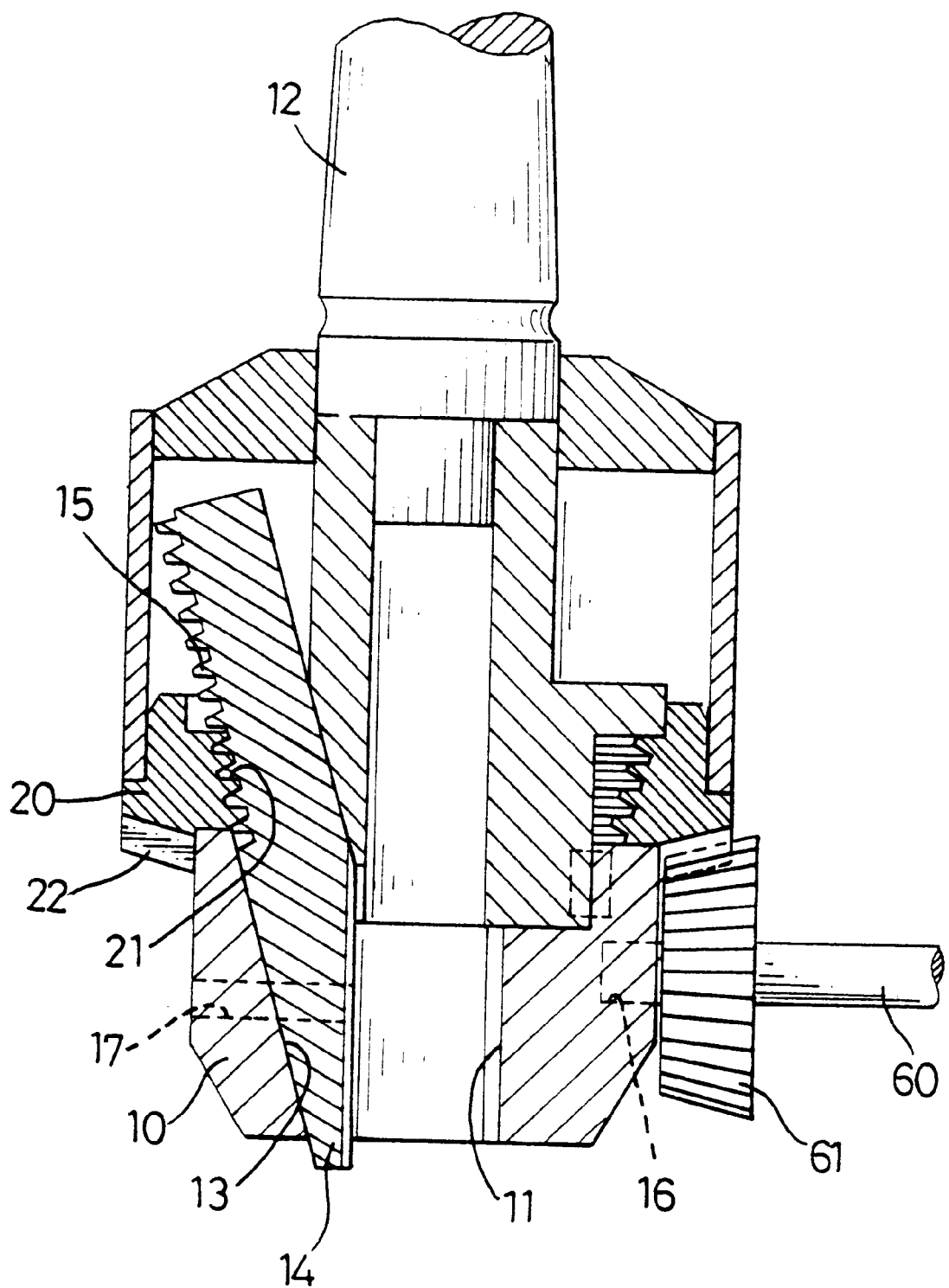
FIG. 3 is a side elevational view, partly in section, it of the drill positioned by the means in the chuck.

Referring to the drawings and initially to FIGS. 1 through 3, a chuck includes a body 10 having a passage 11 defined centrally therethrough and a shaft 12 connected to the body 10 so as to be connected to a drill machine (not shown). Three slots 13 are inclinedly defined in a periphery defining the passage 11 so as to respectively receive a respective one of three clamping members 14 therein which are inclinedly and movably received in the slots 13 and extend beyond an underside of the body 10. Each of the clamping members 14 has a first toothed portion 15 defined in an outer periphery thereof so as to be engaged with a inner toothed portion 21 of an annular member 20 rotatably mounted to the clamping members 14. The annular member 20 has a second toothed portion 22 defined in an underside thereof.

The body 10 has three recesses 16 (only one is shown) defined in an outer periphery thereof and an aperture 17 defined radially therethrough which communicates with the passage 11 in which the drill 70 is received. The aperture 11 has a threaded portion defined in an inner periphery defining the aperture 17. The drill 70 has a recessed portion 71 or a plan surface defined in an outer periphery thereof and when the drill 70 is inserted into the passage 11, the recessed portion 71 is located to face to the aperture 17.

A positioning member, such as a bolt 80 is threadedly received in the aperture 17 so as to contact a bottom defining the recessed portion 71 at a distal end thereof. When in use, a user inserts a distal end of a locking member 60 into one of the recesses 16 and engages a bevel gear 61 with the second toothed portion 22 so that when rotating the locking member 60, the annular member 20 is rotated to move the three clamping members 14 to clamp the drill 70. Therefore, the drill 70 is not only clamped by the three clamping members 14 but also positioned by the bolt 80 such that the drill 70 is limited from rotating when in use.

Figure 4:
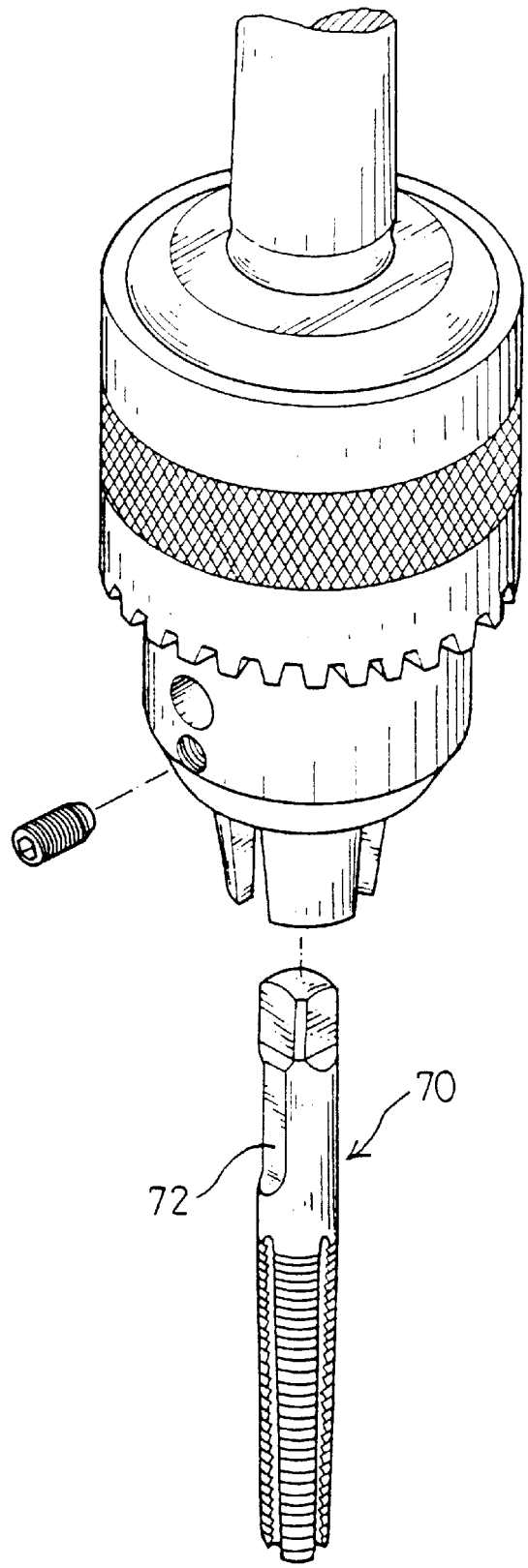
FIG. 4 is an exploded view of another embodiment of the drill and the means of the present invention for securing the drill in a chuck.
Figure 5:
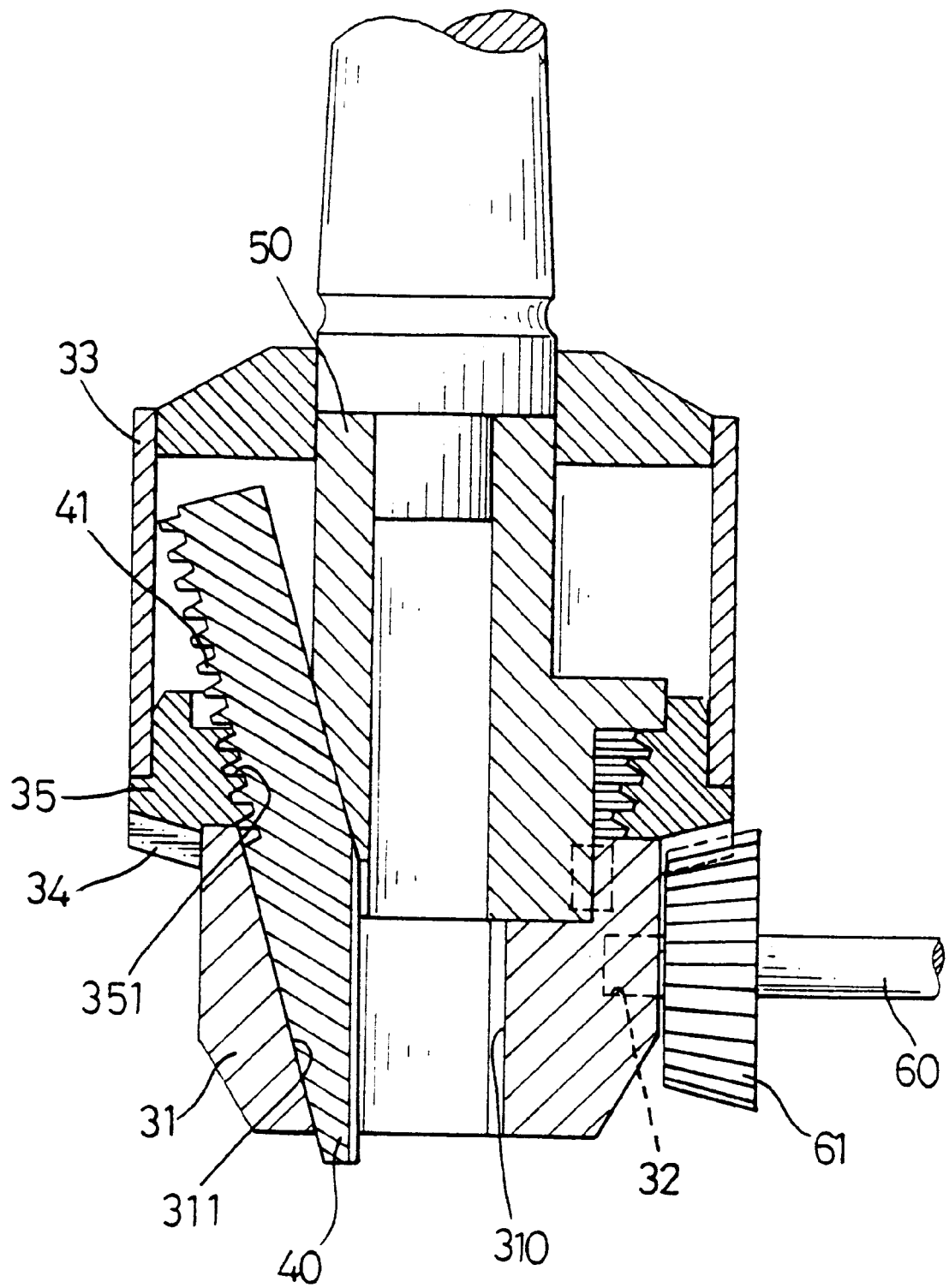
FIG. 5 is a side elevational view of a conventional means for securing a drill in a chuck.
Figure 6:
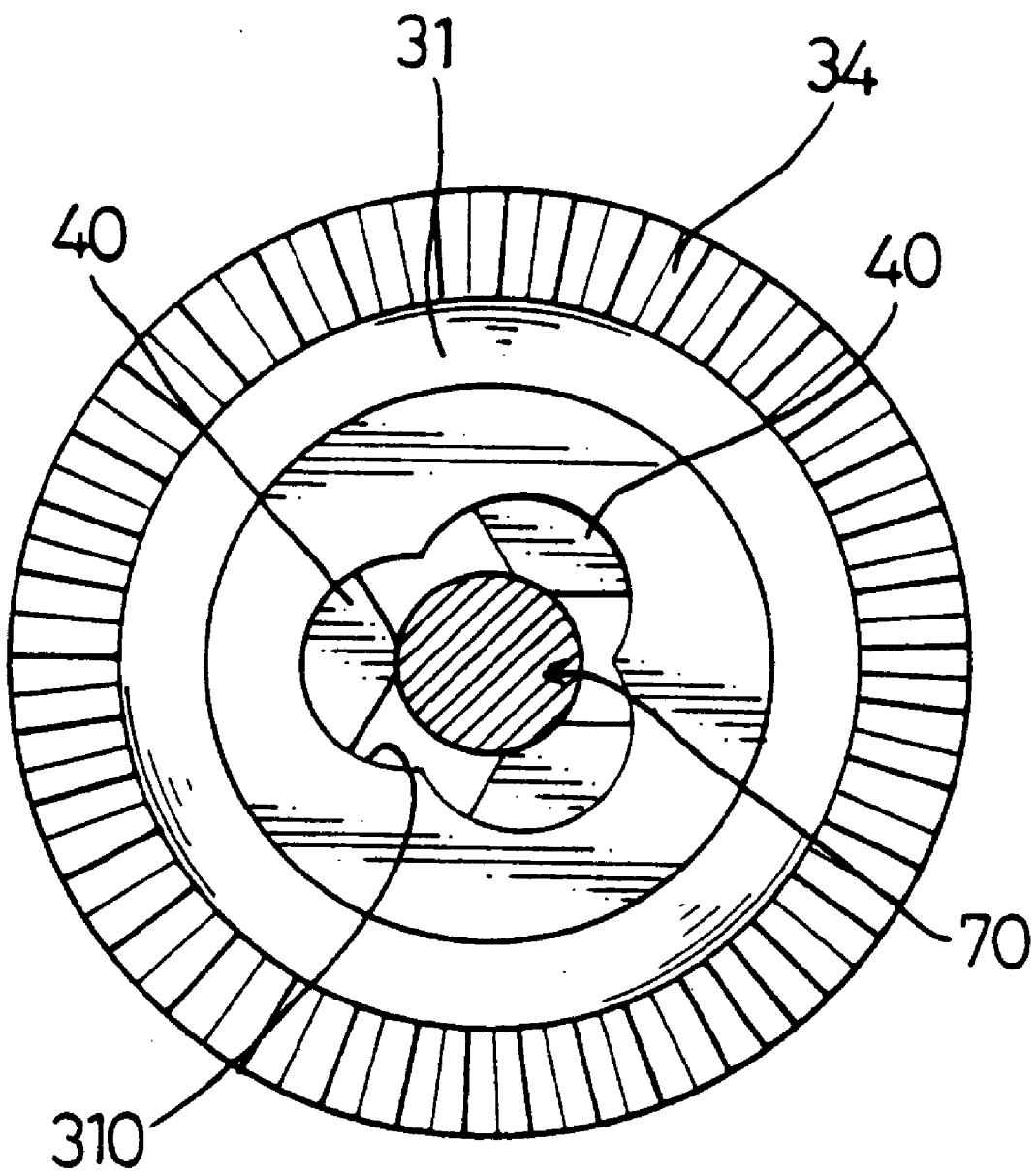
FIG. 6 is a sectional view, partly in section, of the conventional chuck shown in FIG. 5 wherein a conventional drill is positioned in the chuck.

Referring to FIG. 4, the recessed portion can be a long plan surface 72 or a notch or the like so that the bolt 80 can fixedly contact the drill 70.

Although the invention has been explained in relation to its preferred embodiment, it is to be understood that many other possible modifications and variations can be made without departing from the spirit and scope of the invention as hereinafter claimed.

What is claimed is:

1. Combination of a drill and a means for securing the drill in a chuck which includes a body having a passage defined centrally therethrough and at least three slots inclinedly defined in a periphery defining said passage, at least three clamping members inclinedly and movably received in said slots and each of said clamping members having a first toothed portion defined in an outer periphery thereof, an annular member rotatably engaged with said first toothed portions of said clamping members and having a second toothed portion defined in an underside thereof, said means comprising:

at least one aperture adapted to be defined radially through said body and communicating with said passage in which said drill is received, and a positioning member received in said aperture.

2. The combination as claimed in claim 1 wherein said drill has a recessed portion defined in an outer periphery thereof such that said positioning member contacts a bottom defining said recessed portion at a distal end thereof.

3. The combination as claimed in claim 2 wherein said recessed portion of said drill is a plan surface.

4. The combination as claimed in claim 1 wherein said aperture has a threaded portion defined in an inner periphery defining said aperture and said positioning member is a bolt.

\* \* \* \* \*